United States Patent Office 3,851,037
Patented Nov. 26, 1974

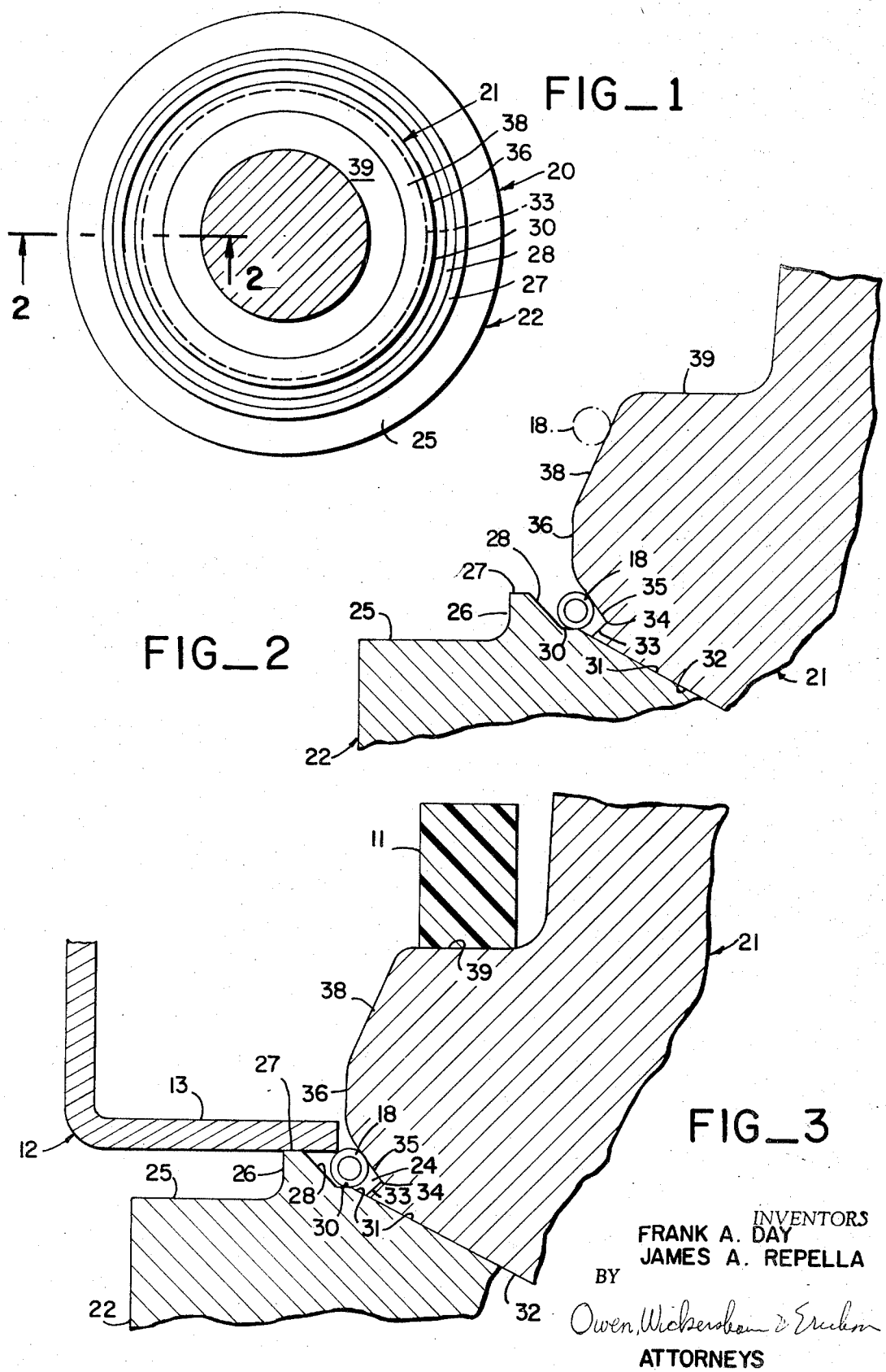

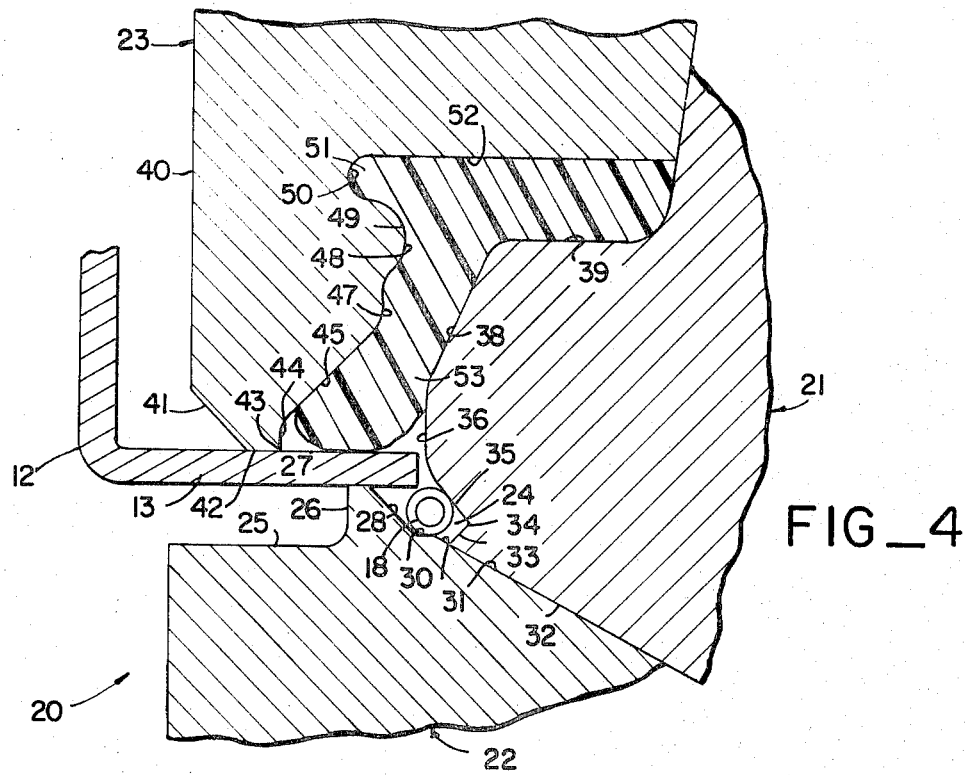
FIG_4
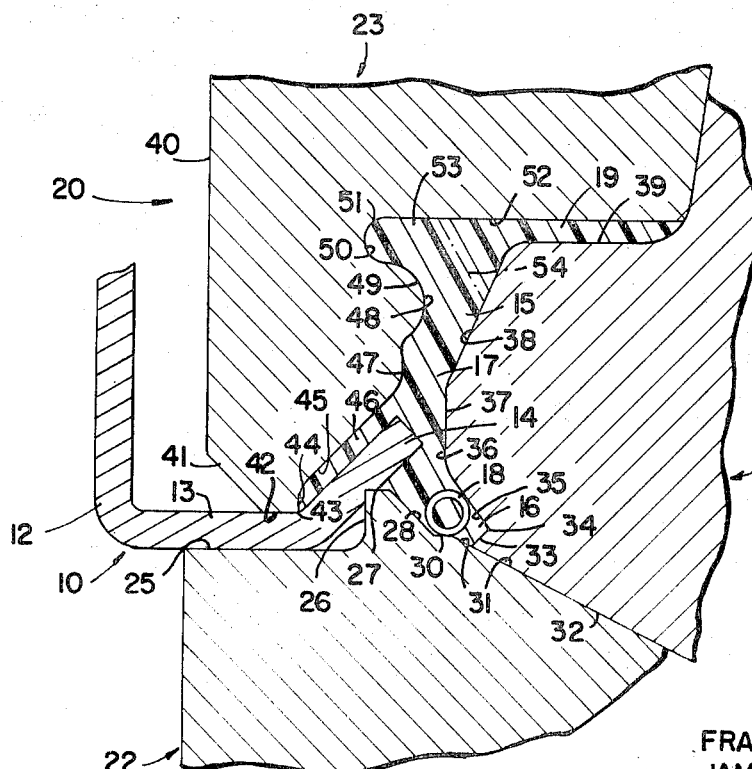
FIG_5
INVENTORS
FRANK A. DAY
JAMES A. REPELLA
BY
ATTORNEYS

3,851,037
METHOD FOR MOLDING DUAL-LIP SHAFT SEALS WITH A GARTER SPRING MOLDED INTO THE AUXILIARY LIP
Frank A. Day, Farmington, and James A. Repella, Madison Heights, Mich., assignors to Federal-Mogul Corporation, Detroit, Mich.
Filed May 3, 1971, Ser. No. 139,618
Int. Cl. B29d 3/00
U.S. Cl. 264—229
2 Claims

ABSTRACT OF THE DISCLOSURE

Method and apparatus for making a radial shaft seal of the type having a main sealing lip, provided with a garter spring retaining groove for holding a free garter spring therein, and a dust sealing lip with an embedded garter spring retained in stretched position. During the molding, the spring is held in stretched position, so that its coils are open and the elastomer can flow through them into the cavity defining the sealing edge of the lip. The spring is aligned and retained in position by two walls that it abuts against; these walls prevent its dislocation and retain it in its stretched position.

BACKGROUND OF THE INVENTION

Dual-lip seals and methods for making them are by now well known. For example, see Pat. No. 3,010,748. space limitations have prevented the use of garter springs in the auxiliary lips of these seals, while, in addition, if they were used on the outside of the lip that is intended to exclude dust, dirt, water and other objectionable matter, the garter spring itself would soon become inoperative by being plugged with debris, dirt, and dust, and corrosion would be a severe problem. As a result, dust-excluding lips have normally been without spring loading. While this has an advantage of simplicity, it has the disadvantage that as the lip wears, it may lose contact with the shaft and fail properly to perform its functions, whereas, if it were spring-urged, the urging of the spring would keep the lip in contact where it should be after initial wear.

There have been problems in locating springs within sealing lips. If the lip is molded with the spring in rest position, it is not fully effective, and the coils are not sufficiently open to permit the passage of elastomer therethrough. During molding, the elastomer as it flows to form the lip tends to force the spring to its rest position, and reinforces the spring's natural inclination to assume it.

Also, there has been great difficulty in properly positioning a molded-in spring. If the spring becomes cocked during molding, it later exerts uneven pressure and the seal would be better without it. It is easy to draw pictures, such as are shown in many patents in which springs are molded into rubber, but it is not so easy to retain these springs during molding in a position where they can exert uniform and proper force and be retained in a properly stretched position. This retention is accomplished in the present invention.

Another problem to which the invention is directed is, after the spring has been properly located in the mold, to keep it there before and during the actual molding operation. In some instances, the flow of elastomer helps, as it does also in the present invention; but at the time the elastomer reaches the spring, the spring must be in its proper position, or the elastomer will tend to displace it even further from the correct position and therefore cause ultimate rejection of the seal or a defective product.

BRIEF SUMMARY OF THE INVENTION

In the invention, the spring is inserted in the lower mold cavity at the groove where the dust-sealing lip is formed. The molding is the type known as BUD-Reform in which the elastomer is anchored to a portion of the metal case that is bent during the molding operation, so as to provide a closed-stroke molding operation explained in U.S. Pat. 3,004,298. This form of molding has advantages in providing dual-lip seals, and in the particular invention it has a special advantage that at the early stages before molding and during the flow of the elastomer before the elastomer actually reaches the area where the spring is, the spring is maintained in position to be embedded properly.

The spring is placed against a frustoconical inwardly extending wall, tangent to that wall, and it is naturally held in this position by the pressure of the elastomer. In this position, the spring is still stretched. The spring is kept from going further and from reaching a rest position by a generally cylindrical or radial wall, which limits further movement of the spring and insures contact by seating the spring both against the frustoconical wall and against itself. Thus, the spring is held in contact in two places. To obtain sufficient lip body, the seating portion also acts as an outward step for the body on the opposite side of the lip.

BRIEF DESCRIPTION OF THE DRAWINGS

In the drawings:

FIG. 1 is a top plan view partly in section of a portion of a mold embodying the principles of the invention.

FIG. 2 is a fragmentary view in elevation and in section on an enlarged scale of a portion of the mold of FIG. 1, being taken along the line 2—2 in FIG. 1. It shows the lower mold member and the mold core, with the spring installed, and also shows in broken lines the free rest position of the spring, at the radius it would take if it were not kept stretched.

FIG. 3 is a view similar to FIG. 2, with the metal case in place and with the prep installed ready for molding.

FIG. 4 is a similar view showing the upper mold member just as it begins the mold's closed stroke, with the elastomer not yet in contact with the tip of the metal flange.

FIG. 5 is a similar view of the closed and final position of the mold, which it retains during curing.

DESCRIPTION OF A PREFERRED EMBODIMENT

The preferred embodiment of this invention embodies the method claimed in U.S. Pat. 3,004,298 and the making of a seal 10 (FIG. 5) similar to that shown and claimed in U.S. Pat. 3,010,748. A ring 11 (FIG. 3) of elastomer known as "prep" is forced by compression molding under heat to flow into a mold cavity and form the seal 10, bonding the elastomer to a metal case 12 having a radially extending flange 13, which, in this particular embodiment, is bent during the molding operation to provide an angularly extending tip portion 14 to which the elastomer is bonded. The mold cavity shapes the elastomer (FIG. 5) to provide a main lip 15, an auxiliary lip 16, and a flexing portion 17 between them. Meanwhile, a somewhat stretched garter spring 18 is incorporated into the auxiliary lip 16. A closed stroke enables many advantages explained in U.S. Pat. 3,004,298. In the drawings herein a type of mold is shown in which the main lip 15 is molded with a "hat" 19 and is eventually trimmed into final position after molding, while the auxiliary lip 16 is molded to its final shape. The invention is also applicable to methods where the dust sealing lip 16 might be trimmed after molding or where the main lip 15 is to be molded to its final shape, or where both lips might be molded to shape or both lips trimmed, but the form shown is generally preferable.

As shown best in FIGS. 4 and 5, the invention may be practiced with a mold 20 having three annular parts—a mold core 21, a lower mold member 22, and an upper mold member 23. The mold core 21 and lower mold member 22 act as the lower half of the mold 20 and are made as separate members primarily in order to afforded release of gas from a cavity 24 (FIGS. 3 and 4) which forms the auxiliary lip 16.

The lower mold member 22 comprises a radially outer flat annular horizontal surface 25, against which the seal flange 13 is eventually brought to rest. The surface 25 encircles a vertically upstanding shoulder 26 leading to a horizontal annular support platform 27 upon which the flange 13 initially rests, as shown in FIG. 3. Moving radially inwardly, the platform 27 is followed by the cavity 24 defining the auxiliary lip 16. This cavity 24 comprises a generally frustoconical annular surface 28 that will eventually be substantially perpendicular to the angularly extending portion 14 of the case flange 13 in FIG. 5. The surface 28 leads radially inwardly and downwardly to a horizontal shelf 30 which is an important feature of this invention, for the spring 18 rests against this shelf 30 during molding. Following this shelf 30, the lower mold member 22 has a frustoconical surface 31 extending inwardly and downwardly. Part of this surface 31 acts as a surface of the lip cavity 24, but most of it lies inwardly beyond the cavity 24 and abuts against a mating surface 32 of the mold core member 21. The surfaces 31 and 32 engage so snugly that no elastomer can flow between them, but gas can flow between them, and this ability enables the elastomer to fill the lip cavity 24 without trapping gas therein. Thus, the lip 16 is kept from having voids due to gas being trapped.

The mold core member 21 has a short, annular frustoconical surface 33 extending upwardly and radially inwardly to a corner 34 defining the sealing edge of the lip 16, which is molded to its final shape in this example. The other face of the auxiliary sealing lip 16 is formed by an upwardly and outwardly extending frustoconical annular surface 35 of the mold core 21 that leads to a vertical or cylindrical surface 36, which provides a cylindrical elastomer surface 37 in the seal 10. This surface 36, in turn, leads to an upwardly and inwardly extending frustoconical surface 38 that is used to form one face of the main sealing lip 15. Following that is a flat annular shelf 39 upon which the elastomeric prep 11 originally rests and which later defines part of the hat 19.

The upper mold member 23 (FIG. 4) may have a cylindrical outerwall 40 connected by a frustoconical annular 41 to a flat annular case-engaging surface 42, preferably with an inner circular edge 43. From there, preferably, a generally vertical cylindrical surface 44 extends up to a frustoconical inwardly and upwardly extending annular surface 45 defining an anchor portion 46 of elastomer on one side of the flange portion 14. This leads to a short cylindrical portion of the upper face of the main sealing lip 15. After that, there is an arcuate surface 48 defining a groove 49 in which a garter spring will eventually be seated. An oppositely curved mold surface 50 defines a garter spring retaining wall 51, and a flat annular surface 52 then extends in radially and lies parallel to and opposite the surface 39. This surface 52 is what initially engages the elastomeric prep and it eventually defines the other surface of the hat 19. There may be sprues for excess elastomer leading from the hat-defining portions of the mold 10.

In making the seal 10, the first step is to locate the spring 18 in the cavity 24 for the auxilary lip 16. As shown in a dotted line position in FIG. 2, if the spring 18 were simply dropped onto the mold core 21, it would rest on the wall 38 well above and also radially within the place where it should be. Its rest position, of course, defines a smaller ring than any of its stretched positions. So the spring 18 is forced down and outwardly over the surface 38, and down around the cylindrical surface 36 into the auxiliary mold cavity 24. This is easily done; the spring 18 may be forced down either manually or mechanically, until it snaps into position in the auxiliary lip cavity 24, where it is still in somewhat stretched position, though less stretched than it was for a while. This is important, since the snap-in keeps the spring 18 from walking out of the cavity 24 unless external forces are applied, and, as will be seen, it will be protected from such external forces. The correct position is assured by the spring 18 seeking to achieve its unstretched shape and by its resultant abutting of both the conical wall 35 and the flat shelf 30, which converge toward each other and cooperate with the spring coil size to prevent further passage by the spring 18 inwardly or downwardly. The spring 18 thus is positively positioned and is held there in a somewhat stretched position.

The next step is shown in FIG. 3. The metal case 12 is placed in position with the flange 13 on the platform 27, and an annular prep 11 of elastomer is placed on the upper shelf 39.

In the next step, the upper mold member 23 is brought downwardly. The wall 52 of the member 23 contacts the prep 11 and since the mold 20 is heated, the prep 11 begins to flow, under both compression and heat, downwardly, as shown in FIG. 4. Before the elastomer 53 can flow out of the mold, the surface 42 of the upper mold member 23 engages the flange 13, and the surface 42 and the platform 27 operate to prevent any flash from passing outwardly beyond this point. From then on, the mold 20 moves in a closed stroke, as described in U.S. Pat. 3,004,298, into the position shown in FIG. 5.

Since the elastomer 53 is moving in the very direction that tends to force the spring 18 snugly against its two walls 30 and 35, the spring 18 is held accurately in place. Moreover, since the spring 18 is partly stretched, the elastomer 53 can pass in between its coils. Even if the spring 18 were fully closed, there would of course be some passage of elastomer, because only the innermost points would be fully closed, but, in the present invention, the additional stretching enables freer passage of the elastomer and helps to prevent any voids in the dust-sealing lip 16, the active portion of which lies completely beyond the spring 18, so that substantially all the elastomer must reach this lip portion through the spring 18.

Considerable pressure is exerted upon the elastomer 53 to prevent voids, and any gases generated or found in the cavity 24 exit between the meeting faces 31 and 32. Also, a vacuum-molding technique may be used to withdraw the gases.

FIG. 5 shows the final position of the mold 20, with the case flange 13 fully bent to its final position and with the auxiliary spring 18 molded into the lip 16. The main lip 15 is later trimmed along the broken line 54 in FIG. 5 after removal from the mold 20 upon the completion of curing. The final product is the dual-lip seal 10 with the auxiliary lip 16 having the garter spring 18 molded into it.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A method for molding an integral molded dual-lip seal having a spring molded into the auxiliary lip, said method employing a mold having a plurality of members and providing a pair of facing converging walls that act to define said auxiliary lip, one of said facing walls being of lesser diameter than the other at any radial plane through them both, one of said members being a mold core providing at least said lesser diameter wall, said mold core also including a mold wall of larger diameter than the widest diameter portion of said lesser diameter wall and joined to said lesser diameter wall, comprising:
stretching a garter spring that is of smaller diameter than said larger diameter wall and passing it while stretched around said larger diameter wall and to its juncture with said lesser diameter wall,
then snapping said garter spring initially into its final position against said facing converging mold walls that are to define the auxiliary lip,
spacing said spring from the sealing edge of that lip by the size of the spring coils relative to the convergence of the walls,
preventing said spring from assuming a free or rest position and maintaining it in a stretched position positively by engagement with said walls,
preventing retraction of the spring from its correct position by the same walls extending radially outwardly so that before filling said mold with elastomer the spring is snapped into its said final position, where it is stretched less than it would be in any direction in which it can move,
filling said mold with elastomer, and
curing said elastomer.

2. The method of claim 1 including protecting the spring in its molding position against external forces by filling the mold with elastomer from a direction forcing the spring to retain its final position during molding and while flowing the elastomer through the partially stretched coils of the spring into the cavity providing the auxiliary lip.

References Cited
UNITED STATES PATENTS

| | | | |
|---|---|---|---|
| 3,666,852 | 5/1972 | Burke | 264—229 |
| 3,330,567 | 7/1967 | Mercer et al. | 277—164 |
| 3,603,602 | 9/1971 | Padula | 277—164 |
| 3,246,369 | 4/1966 | Rhoads et al. | 18—Dig. 47 |
| 3,415,924 | 12/1968 | Girardi | 264—229 |
| 3,061,862 | 11/1962 | Minor | 264—229 X |
| 3,162,456 | 12/1964 | Williams | 18—Dig. 47 |
| 2,619,678 | 12/1952 | Crooker | 264—229 |

ROBERT F. WHITE, Primary Examiner

T. E. BALHOFF, Assistant Examiner

U.S. Cl. X.R.

264—268